US009804700B2

(12) United States Patent
Cho et al.

(10) Patent No.: US 9,804,700 B2
(45) Date of Patent: Oct. 31, 2017

(54) DISPLAY DEVICE HAVING TOUCH SCREEN PANEL (75) Inventors: Namkyun Cho, Gumi-si (KR); Keuksang Kwon, Gumi-si (KR); Jaehyun Park, Gumi-si (KR)

(73) Assignee: LG DISPLAY CO., LTD., Seoul (KR)

( * ) Notice: Subject to any disclaimer, the term of this patent is extended or adjusted under 35 U.S.C. 154(b) by 954 days.

(21) Appl. No.: 13/286,811

(22) Filed: Nov. 1, 2011

(65) Prior Publication Data

US 2012/0133599 A1 May 31, 2012

(30) Foreign Application Priority Data

Nov. 25, 2010 (KR) ........................ 10-2010-0118248

(51) Int. Cl.
*G06F 3/041* (2006.01)

(52) U.S. Cl.
CPC .................................. *G06F 3/0412* (2013.01)

(58) Field of Classification Search
CPC ...................................................... G06F 3/0412
USPC ........................................................ 345/173
See application file for complete search history.

(56) References Cited

U.S. PATENT DOCUMENTS

| 6,424,094 B1 * | 7/2002 | Feldman | G06F 3/0412 |
| | | | 315/169.3 |
| 6,532,152 B1 * | 3/2003 | White | G02F 1/133308 |
| | | | 312/223.1 |
| 8,537,096 B2 * | 9/2013 | Hong | 345/102 |
| 8,723,806 B2 * | 5/2014 | Kim et al. | 345/173 |
| 2009/0189537 A1 * | 7/2009 | Hong | 315/291 |
| 2010/0053112 A1 * | 3/2010 | Chen | 345/174 |
| 2010/0079394 A1 * | 4/2010 | Tanaka et al. | 345/173 |
| 2010/0110040 A1 * | 5/2010 | Kim et al. | 345/174 |
| 2010/0182261 A1 * | 7/2010 | Nose | G06F 3/0416 |
| | | | 345/173 |

(Continued)

FOREIGN PATENT DOCUMENTS

| CN | 1851534 A | 10/2006 |
| CN | 101667088 A | 3/2010 |

(Continued)

OTHER PUBLICATIONS

Office Action issued in corresponding Korean Patent Application No. 10-2010-0118248, dated Apr. 19, 2013.

(Continued)

*Primary Examiner* — Kent Chang
*Assistant Examiner* — Scott Au
(74) *Attorney, Agent, or Firm* — Seed Intellectual Property Law Group LLP (57) ABSTRACT

A display device having a display panel and a touch screen panel is disclosed. The display device includes a display panel driving unit formed on a portion of the rear of the display panel and including a plurality of display panel driving circuits to drive the display panel; a touch screen panel driving unit formed on other portion of the rear of the display panel to be adjacent to the display panel driving unit and including a plurality of touch screen panel driving circuits to drive the touch screen panel; and a connector formed on the display panel driving unit and including a first connector unit connected to at least one of the display panel driving circuits and a second connector unit connected to at least one of the touch screen panel driving circuits.

11 Claims, 5 Drawing Sheets

(56) References Cited

U.S. PATENT DOCUMENTS

2010/0241957 A1\* 9/2010 Kim et al. .................... 715/702
2011/0001714 A1\* 1/2011 Sasaki ................. G02F 1/13338
                                                              345/173

FOREIGN PATENT DOCUMENTS

| CN | 201622819 U | 11/2010 |
| KR | 20040000211 A | 1/2004 |
| KR | 20040014085 A | 2/2004 |
| KR | 20070082965 A | 8/2007 |
| KR | 20090000484 A | 1/2009 |

OTHER PUBLICATIONS

Office Action issued in corresponding Chinese Patent Application No. 201110346038.0, dated Jan. 3, 2014, 16 pages.

\* cited by examiner

FIG. 1

RELATED ART

DISPLAY DEVICE HAVING TOUCH SCREEN PANEL

This application claims the priority and the benefit under 35 U.S.C. §119(a) on Patent Application No. 10-2010-0118248 filed in Republic of Korea on Nov. 25, 2010 the entire contents of which are hereby incorporated by reference.

BACKGROUND

Field of the Invention

The present disclosure relates to a display device having a touch screen panel.

Discussion of the Related Art

Recently, various input devices such as a keyboard, a mouse, a trackball, a joystick, a digitizer, and the like are used to implement interaction between the user and consumer electronics or various kinds of information communication equipment. However, there is learning the usage of these input devices and inconvenience in the required additional operating space, which makes it difficult to enhance product completeness. Thus, demand for input devices with a simple and convenient interface and capable of reducing malfunction due to inaccurate input is growing. According to the demand, a touch screen panel has been proposed, which receives input information from the user's direct interaction with a screen by using his or her hand or pen.

A touch screen panel is simple to operate and has little malfunction. Furthermore, the user may not only provide input information without using a separate input device but also quickly and easily operate the touch screen panel through the contents displayed on the screen. Because of these reasons, touch screen panels are widely adopted for various display panels.

However, when a display device having a touch screen panel is fabricated by applying the touch screen panel to a display panel, the touch screen panel and the display panel are typically fabricated by separate makers. In other words, since a board including a driving circuit for the touch screen panel and that for the display panel are fabricated separately, an integration issue of combining the two panels into a single board has been raised.

In addition, for communication among the display panel, the touch screen panel, and a main system, a low voltage differential signaling (LVDS) cable for the display panel and a universal serial bus (USB) cable for the touch screen panel are required.

Figure 1:
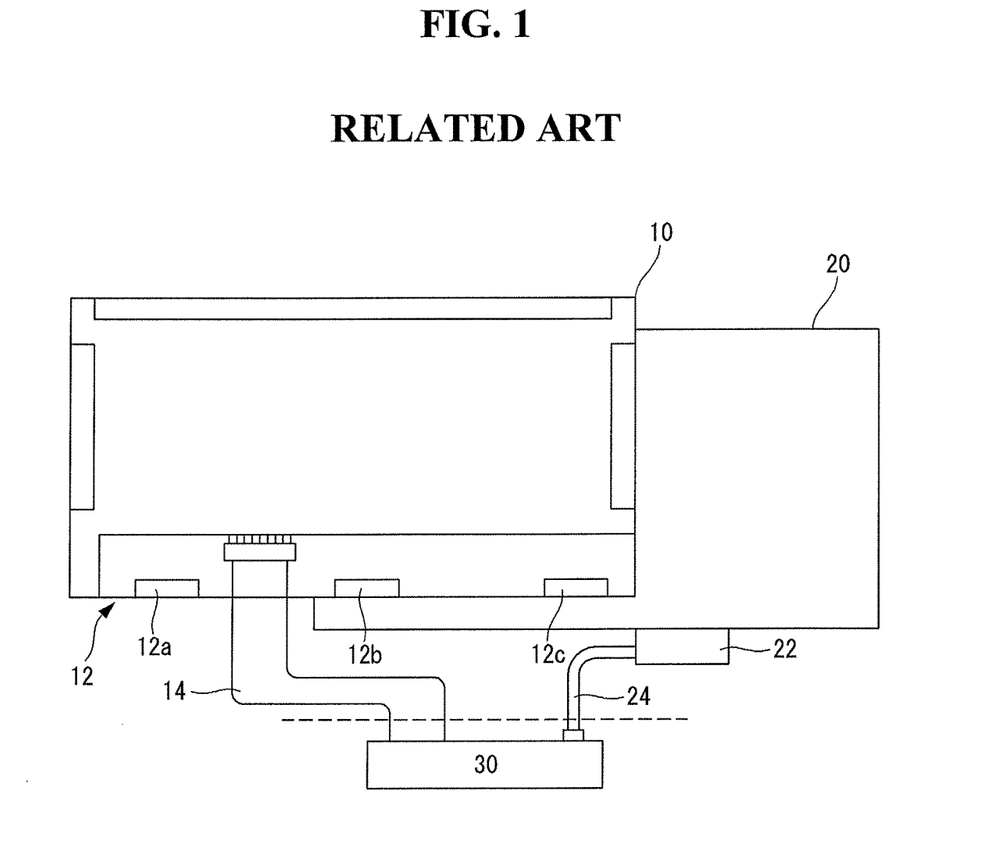
FIG. 1 is a schematic view illustrating the rear surface of a display device having a related art touch screen panel, on which a display panel driving board and a touch screen panel driving board are disposed.

FIG. 1 illustrates a schematic view of the rear surface of a display device having a touch screen panel in the related art, on which a display panel driving board and a touch screen panel driving board are disposed. In FIG. 1, a reference numeral 10 indicates a display panel, and a reference numeral 12 indicates a display panel driving board. Also, reference numerals 12a, 12b, and 12c indicate a display panel driving ICs of the display panel driving board 12, a reference numeral 20 indicates a touch screen panel, a reference numeral 22 indicates a touch screen panel driving board, a reference numeral 30 indicates a main system, a reference numeral 14 indicates an LVDS cable for communication between the display panel 10 and the main system 30, and a reference numeral 24 an universal serial bus (USB) cable for communication between the touch screen panel driving board 22 and the main system 30, respectively.

As illustrated in FIG. 1, since the display panel driving board 12 and the touch screen panel driving board 22 are separated from each other in the related art display device having a touch screen panel, the LVDS cable 14 and the USB cable 24 are required in order to connect the boards 12 and 22 to the main system 30.

Accordingly, there is a need for reducing overall size of the device by integrating the display panel driving board 12 and the touch screen panel driving board 22 in one body and removing the USB cable to reduce the cost for manufacturing the display device having a touch screen panel.

BRIEF SUMMARY

A display device having a touch screen panel includes a display panel driving unit formed on a portion of the rear of the display panel and including display panel driving circuits to drive the display panel; a touch screen panel driving unit formed on a portion of the rear of the display panel to be adjacent to the display panel driving unit and including a touch screen panel driving circuits to drive the touch screen panel; and a connector formed on the display panel driving unit and including a first connector unit connected to at least one of display panel driving circuits and a second connector unit connected to at least one of touch screen panel driving circuits.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE DRAWINGS AND THE PRESENTLY PREFERRED EMBODIMENTS

Reference will now be made in detail to the preferred embodiments of the present invention, examples of which are illustrated in the accompanying drawings.

The same reference signs are used to indicate the same components throughout the specification.

Figure 2:
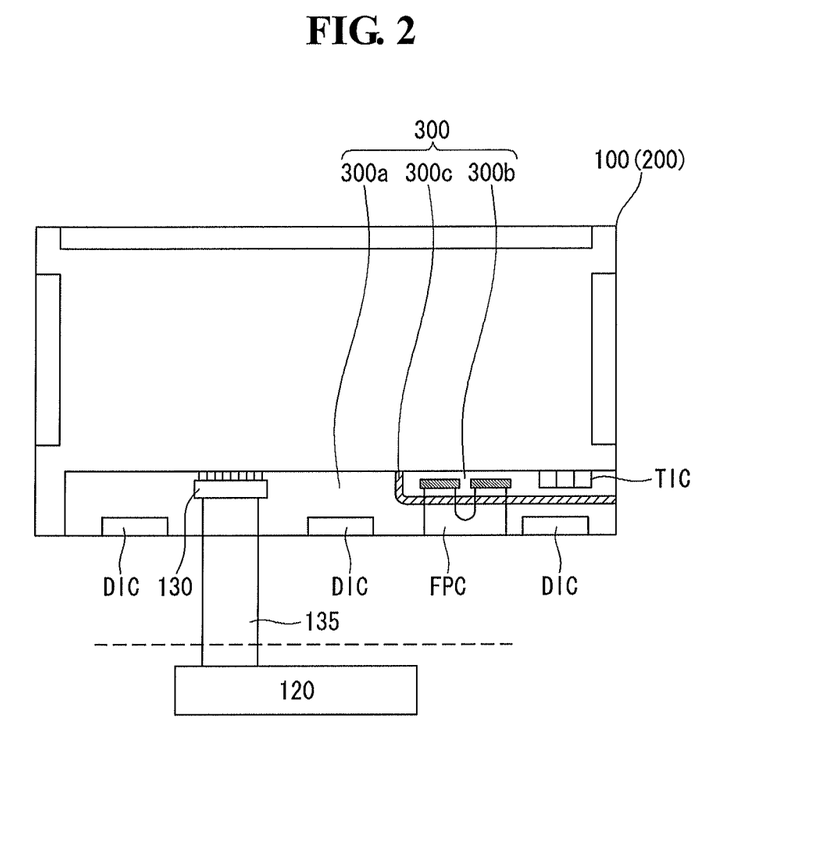
FIG. 2 is a schematic view illustrating the rear surface of a display device having a touch screen panel according to an embodiment of the present invention.

FIG. 2 illustrates the rear surface of a display device having a touch screen panel according to an embodiment of the present invention.

Referring to FIG. 2, a display device having a touch screen panel according to an embodiment of the present invention includes a display panel 100 and a touch screen panel 200 formed on the display panel 100. Also, the display device includes a device driving unit 300 having a display panel driving unit 300a, a touch screen panel driving unit 300b, and a separating region 300c for separating the display panel driving unit 300a and the touch screen panel driving unit 300b, all of which are disposed on a portion of the rear surface of the display device.

In the display panel driving unit 300a, display panel driving circuits (DICs) for driving the display panel 100 and wirings (not shown) for connecting the display panel driving circuits (DICs) to the display panel 100 are formed, and also an LVDS connector 130 for transmitting and receiving signals between the display panel 100 and a main system 120 and between the touch screen panel 200 and the main system 120 is formed. The embodiment of the present invention is described by using LVDS connector 130, but is not limited thereto. For example, different interfaces which transmit and receive signals between the display panel 100 and the main system 120 and between the touch screen panel 200 and the main system 120, such as a transition minimized differential signaling (TMDS) connector and the like, may also be used.

The touch screen panel driving unit 300b has touch screen panel driving circuits DICs for driving the touch screen panel 200, wirings (not shown) for connecting the touch screen panel 200 to touch screen panel driving circuits TICs, and a flexible printed circuit FPC connected to the touch screen panel 200 disposed in the front of the display panel 100. In addition, the touch screen panel driving circuits TICs are connected to dummy pins of the LVDS connector 130 by metal lines (not shown) for transmitting and receiving signals to and from the main system 120. The touch screen panel driving circuits TICs are connected to the flexible printed circuit FPC for transmitting and receiving signals to and from the touch screen panel 200. In FIG. 2, configuration of metal lines connecting the touch screen panel driving circuits TICs and the LVDS connector 130 is omitted to simplify the drawing.

Figure 3:
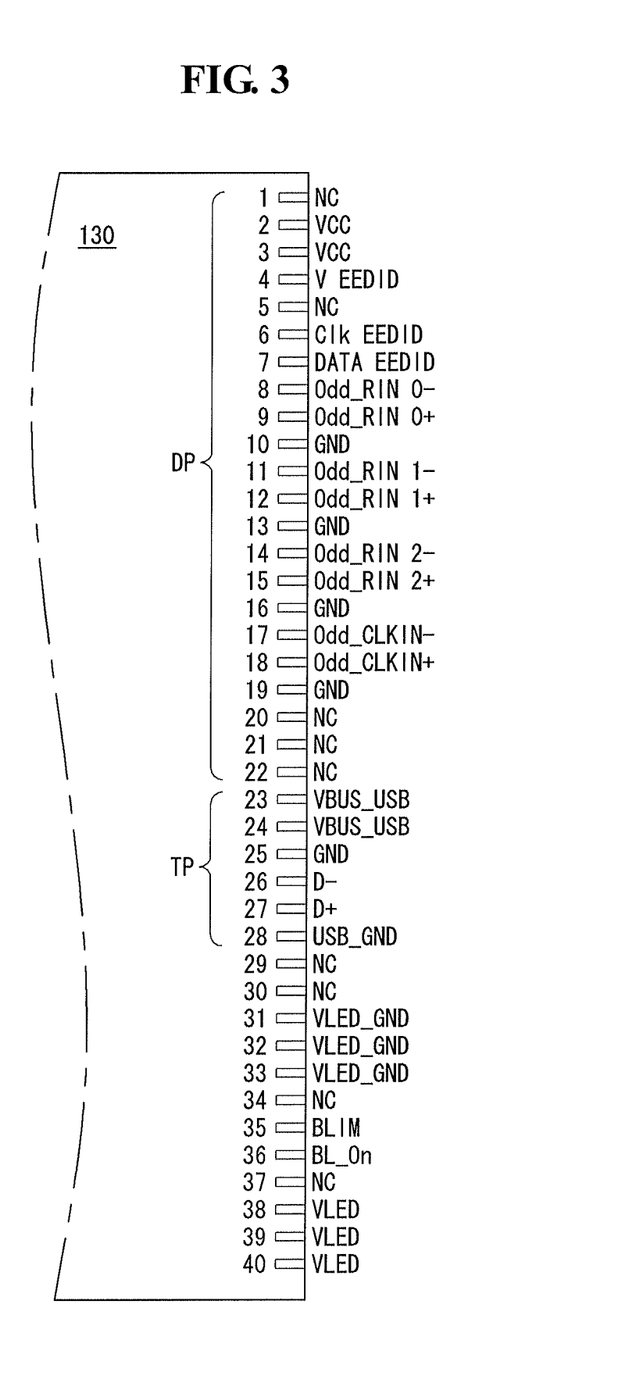
FIG. 3 is a schematic view illustrating a pin array of an LVDS connector according to an embodiment of the present invention.

An integration cable 135 is a cable which functions as both LVDS cable and USB cable, connects the LVDS connector 130 and the main system 120. FIG. 3 illustrates a pin array of an LVDS connector according to an embodiment of the present invention.

As shown in FIG. 3, the LVDS connector 130 includes 40 pins, wherein pin numbers 1 to 22 are assigned to drive the display panel, pin numbers 23 to 28 are assigned to drive the touch screen panel, and pin numbers 31 to 40 are assigned to control a backlight power supply. Name and function of each pin are not essential feature of the present invention, therefore, the detailed description thereof is omitted.

As described above, since the LVDS connector 130 including 1st to 22nd pins for transmitting and receiving signals between the display panel 100 and the main system 120, and 23th to 28th pins for transmitting and receiving signals between the touch screen panel 200 and the main system 120 is formed in the display panel driving unit 300a, it is possible to use dummy pins of the LVDS connector 130 as terminals for the touch screen panel driving unit 300b. Accordingly, the integration cable may be integrated into one cable without having to use the LVDS cable and the USB cable separately. Therefore, since there is no need to allocate separate cables and pins for transmitting signals between the display panel 100 and the touch screen panel 200, the present invention may achieve an advantageous effect of improving productivity in a manufacturer's process line and system assembly process, and reducing material costs.

Figure 4:
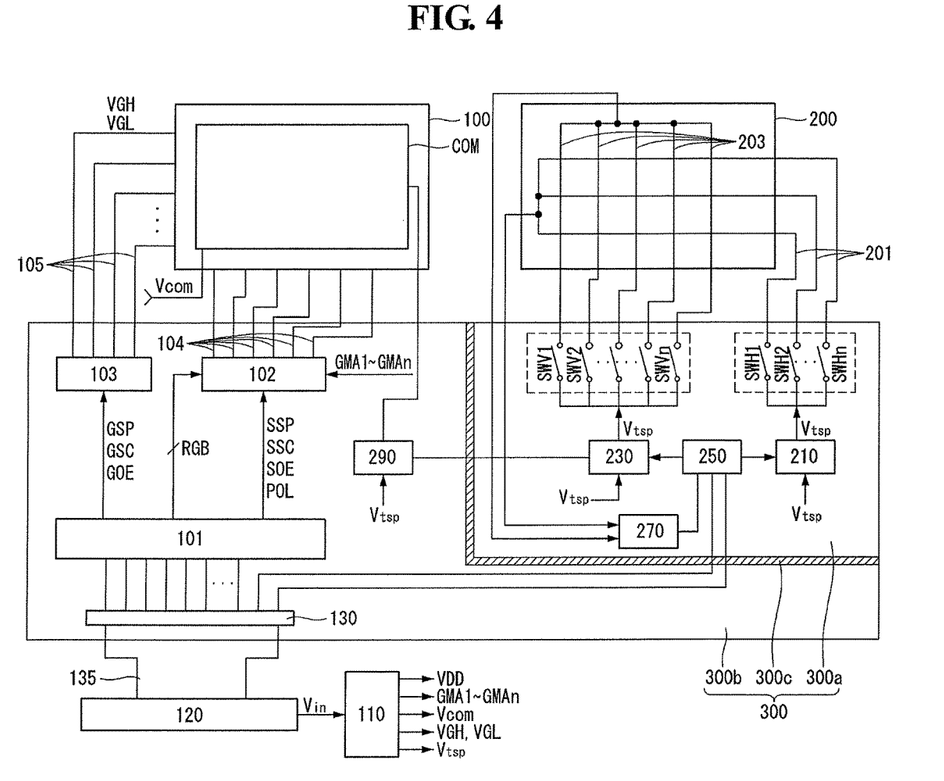
FIG. 4 is a schematic view illustrating a structure of a display device having a touch screen panel according to an embodiment of the present invention.

Next, an example of a display device having a touch screen implemented on a liquid crystal display panel will be described in more detail with reference to FIGS. 4 to 6. FIG. 4 illustrates a structure of a display device having a touch screen panel according to an embodiment of the present invention, FIG. 5 illustrates a display device having a touch screen panel shown in FIG. 4, and FIG. 6 illustrates a configuration of a common electrode, a common voltage generating circuit, and a compensating circuit of a liquid crystal display panel shown in FIG. 4.

Figure 5:
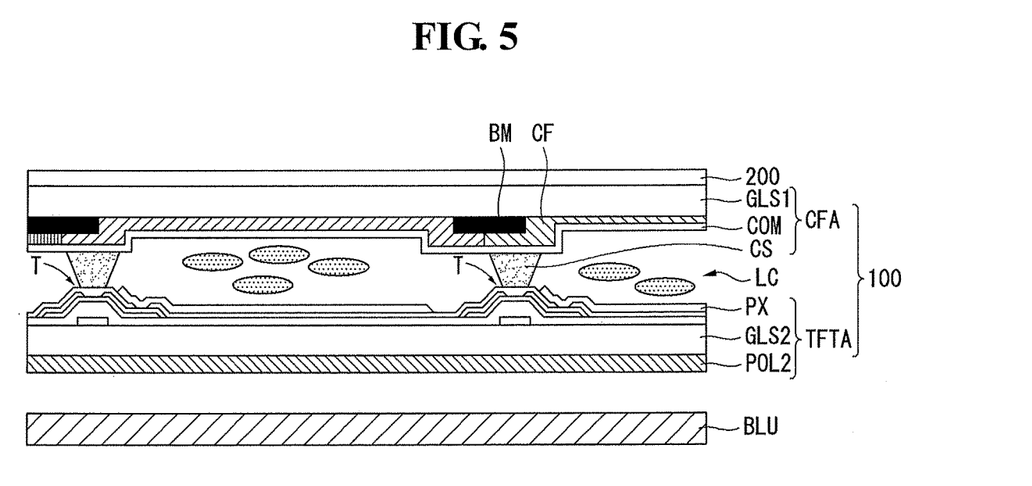
FIG. 5 is a cross-sectional view of a display device having a touch screen panel shown in FIG. 4.
Figure 6:
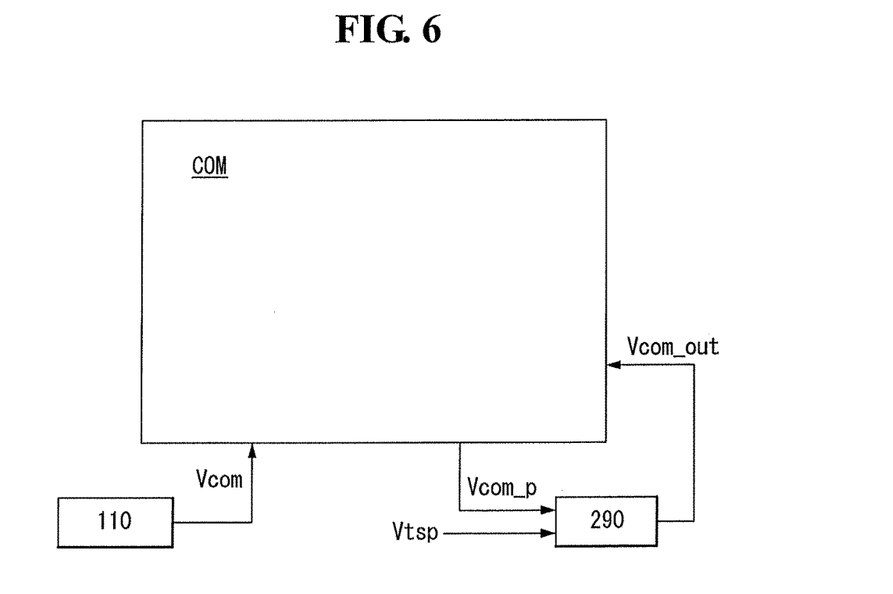
FIG. 6 is a block diagram illustrating a configuration of a common electrode, a common voltage generating circuit, and a compensating circuit of a liquid crystal display panel shown in FIG. 4.

Referring FIGS. 4 and 5, a display device having a touch screen panel according to the embodiment of the present invention includes a display panel 100, a backlight unit BLU, a timing controller 101, a data driving unit 102, a gate driving unit 103, a power supply unit 110, a main system 120, a touch screen panel 200, a first conductive pattern driving circuit 210, a second conductive pattern driving circuit 230, a touch controller 250, a touch recognition processor 270, and a compensating circuit 290.

Among the components above, the timing controller 101, the data driving unit 102, the gate driving unit 103, and the compensating circuit 290, which are driving circuits for driving the display panel 100, are formed on the display panel driving unit 300a of the device driving unit 300 shown in FIGS. 2 and 4. The first conductive pattern driving circuit 210, the second conductive pattern driving circuit 230, the touch controller 250, and the touch recognition processor 270, which are driving circuits for driving the touch screen panel 200, are formed in the touch screen panel driving unit 300b of the device driving unit 300. The power supply unit 110, which supplies power to the display panel driving unit 300a and the touch screen panel driving unit 300b, may be formed in the display panel driving unit 300a or out of the display driving unit 300a depending on the situation.

The display panel 100 includes a color filter array CFA, a thin film transistor array TFTA, a liquid crystal layer LC disposed between the color filter array CFA and a thin film transistor array TFTA, and a column spacer CS for maintaining a cell gap of the liquid crystal layer LC. The color filter array CFA includes a color filter CF and a black matrix BM formed on one side of an upper substrate GLS1, and a common electrode COM formed on the color filter CF and the black matrix BM. Further, the touch screen panel 200 is formed on the other side of the upper substrate GLS1. The thin film transistor array TFTA includes data lines 104 and gate lines 105 formed in such a way to cross over each other on one side of a lower substrate GLS2, thin film transistors T formed on crossing regions of the data lines 104 and the gate lines 105, and pixels defined by the data lines 104 and the gate lines 105 crossing each other. Further, a lower polarizer POL2 is adhered to the other side of the lower substrate GLS2.

In this embodiment, the common electrode COM is formed on the upper substrate GLS1. The common electrode COM is formed on the upper substrate GLS1 in a vertical electrical field type driving method such as a twisted nematic (TN) mode, a vertical alignment (VA) mode. However, the common electrode COM is formed on the lower glass substrate GLS2 together with the pixel electrode PX in a horizontal electrical field type driving method such as an in-plane switching (IPS) mode and a fringe field switching (FFS) mode.

The backlight unit BLU is disposed under the display panel 100, and includes a plurality of light sources to evenly irradiate light on the display panel 100. The backlight unit BLU may be implemented by a direct type backlight unit or an edge type backlight unit. The light sources for the backlight unit may include any one or more than two kinds of a hot cathode fluorescent lamp (HCFL), a cold cathode fluorescent lamp (CCFL), an external electrode fluorescent lamp (EEFL), and a light emitting diode (LED).

The data driving unit 102 samples and latches digital video data RGB under the control of a timing controller 101. The data driving unit 102 converts digital video data RGB into positive/negative gamma compensation voltage GMA1 to GMAn to invert polarity of data voltage. The positive/negative data voltage output from the data driving unit 102 is synchronized with the gate pulse output from the gate driving unit 103. The source drive ICs (integrated circuits) of the data driving unit 102 may be connected to the data lines 104 of the display panel 100 by using a chip on glass (COG) process or a tape automated bonding (TAB) process. Further, the source drive ICs may be integrated in the timing controller 101 to be implemented as one chip IC together with the timing controller 101.

The gate driving unit 103 sequentially outputs the gate pulse (or scan pulse) in a display mode under the control of the timing controller 101 and shifts swing voltage of the output to gate high voltage VGH and gate low voltage VGL. The gate pulses output from the gate driving unit 103 are sequentially supplied to the gate lines 105 in synchronization with the data voltage output from the data driving unit 102. The gate high voltage VGH is equal to or higher than a threshold voltage of the thin film transistor (T) while the gate low voltage VGL is lower than the threshold voltage of the thin film transistor (T). The gate drive ICs of the gate drive unit 103 are connected to the gate lines 105 of the lower substrate GLS2 on the display panel 100 through the TAB process, or may be directly formed on the lower substrate GLS2 of the display panel 100 together with pixels through a gate in panel (GIP) process.

The timing controller 101 generates timing control signals for controlling the operation timing of the data driving unit 102 and the gate driving unit 103 by using timing signals from the main system 120. The timing control signals for controlling the operation timing of the data driving unit 102 and the gate driving unit 103 include a gate timing control signal for controlling the operation timing of the gate driving unit 103, and a timing control signal for controlling the operation timing of the data driving unit 102 and polarity of data voltage. The gate timing control signals include a gate start pulse GSP, a gate shift clock GSC, a gate output enable GOE signal, and the like. The gate start pulse GSP is applied to a first gate drive IC first outputting the gate pulse for a period of each frame from the gate driving unit 103 to control a shift start timing of the gate drive IC. The gate shift clock GSC is a clock signal provided for the gate drive ICs of the gate driving unit 103 to shift the gate shift clock GSC. The gate output enable GOE signal controls the output timing of gate drive ICs of the gate driving unit 103.

The data timing control signal includes a source start pulse SSP, a source sampling clock SSC, a polarity control signal POL, a source output enable SOE signal, and the like. The source start pulse SSP is applied to a first source drive IC first sampling data in the data driving unit 102 to control data sampling start timing. The source sampling clock SSC is a clock signal for controlling sampling timing of data in the source drive ICs based on rising or falling edges. The polarity control signal POL controls polarity of data voltage output from the source drive ICs. The source output enable SOE signal controls the output timing of the source drive ICs. If digital video data RGB are input to the data driving unit 102 through a mini low voltage differential signaling (LVDS) interface, the source start pulse SSP and the source sampling clock SSC may be omitted.

The power supply unit 110 is realized by a DC-DC converter including a pulse width modulation (PWM) circuit, a boost converter, a regulator, a charge pump, a voltage dividing circuit, an operation amplifier, and the like. The power supply unit 110 generates power required to drive the display panel 100, the data drive unit 102, the gate drive unit 103, the timing controller 101, the backlight unit BLU, the first conductive pattern driving circuit 210, the second conductive pattern driving circuit 230, and the like by adjusting the input voltage from the main system 120. The power supply voltage output from the power supply unit 110 includes high potential power supply voltage VDD, gate high voltage VGH, gate low voltage VGL, common voltage Vcom, gamma reference voltage having positive/negative polarities VGMA1 to VGMAi, pulse voltage Vtsp, and the like.

The main system 120 transmits the digital video data RGB of input image, timing signals Vsync, Hsync, DE, and MCLK required to drive the display panel 100, and signals required to drive the touch screen panel 200 to the timing controller 101 through the integration cable 135 and the LVDS connector 130.

The touch screen panel 200 includes a plurality of first conductive patterns 201 which are arranged in parallel with each other in a first direction (e.g., X direction); a plurality of second conductive patterns 203 which are arranged in parallel with each other in a second direction (e.g., Y direction) and perpendicular to the first direction; and insulating layers (or insulating patterns) (not shown) which insulate the first conductive patterns 201 and the second conductive patterns 203 electrically from each other.

The first conductive pattern driving circuit 210 scans the first conductive patterns 201 by sequentially supplying the pulse voltage Vtsp from the power supply unit 110 to each of the first conductive patterns 201 of the touch screen panel 200. The first conductive pattern driving circuit 210 floats the remaining first conductive patterns except for the first conductive pattern to which the pulse voltage Vtsp is currently applied. In the floating state, since the current paths between the remaining first conductive patterns 201 and the first conductive pattern driving circuit 210 are opened, an external voltage is not applied to the first conductive patterns which are in a floating state. Meanwhile, the first conductive pattern driving circuit 210 includes horizontal line control switches SWH1 to SWHn supplying the pulse voltage Vtsp to each of the first conductive patterns 201 in response to the scanning control signals from the touch controller 250.

The second conductive pattern driving circuit 230 scans the second conductive patterns 203 by sequentially supplying the pulse voltage Vtsp from the power supply unit 110 to each of the second conductive patterns 203 after scanning the first conductive patterns 201. The remaining second conductive patterns are floated except for one (some) of the second conductive patterns to which the pulse voltage Vtsp is applied. The second conductive pattern driving circuit 230 includes vertical line control switches SWV1 to SWVn supplying the pulse voltage Vtsp to each of the second conductive patterns 203 in response to the scanning control signal from the touch controller 250.

The horizontal line control switches SWH1 to SWHn and the vertical line control switches SWV1 to SWVn are formed in the touch screen panel driving unit 300*b* of the device driving unit 300.

The touch controller 250 provides scanning control signals to the first conductive pattern driving circuit 210 and the second conductive pattern driving circuit 230 for driving the touch screen panel 200.

The touch recognition processor 270, which is connected to the first conductive patterns 201 and the second conductive patterns 203 of the touch screen panel, differentially amplifies voltage of initial capacitance and touch capacitance of the conductive patterns, and converts the amplified voltage into digital data. In addition, the touch recognition processor 270 determines touch positions based on the difference between the initial capacitance and the touch capacitance using a touch recognition algorithm, and outputs touch coordinate data indicating the touch positions to the touch controller 250. The touch controller 250 supplies the touch coordinate data to the dummy pins of the LVDS connector 130 through metal lines, and the touch coordinate data supplied to the dummy pins of the LVDS connector 130 are supplied to the main system 120 through the integration cable 135.

As shown in FIG. 6, the compensating circuit 290 receives the pulse voltage Vtsp from the power supply unit 110 via the first conductive pattern driving circuit 210 and further receives current common voltage from the common electrode COM. Hereinafter, the current common voltage input from the common electrode COM to the compensating circuit 290 is referred to as a second common voltage Vcom_p, the common voltage supplied from the power supply unit 110 to the common electrode COM is referred to as a first common voltage Vcom, and a feedback voltage supplied to the common electrode COM through the compensating circuit 290 is referred to as a third common voltage Vcom_out.

In the embodiment of the present invention, it was described that the pulse voltage Vtsp is supplied to the compensating circuit 290 from the power supply unit 110 via the first conductive pattern driving circuit 210, but the present invention is not limited thereto. The compensating circuit 290 may receive the pulse voltage Vtsp from the power supply unit 110 via the second conductive pattern driving circuit 230, or may receive from both of the first conductive pattern driving circuit 210 and the second conductive pattern driving circuit 230.

In a display device having a touch screen panel, when power is applied to the display device, the display device starts operation, a parasitic capacitance is generated by the common electrode COM of the display panel and the first and second conductive patterns 201 and 203 of the touch screen panel 200. Accordingly, noise having the same frequency as the pulse voltage Vtsp may be induced to the first common voltage Vcom of the common electrode COM.

The compensating circuit 290 is a circuit for removing the noise induced to the common electrode COM by a touch driving pulse at the time of touch operation. To this end, when the second common voltage Vcom_p including noise components is generated in the first common voltage Vcom by touch operation, the compensating circuit 290 generates the third common voltage Vcom_out from which the noise components are removed by using the pulse voltage of the same noise component but with opposite phase, and then supplies the third common voltage Vcom_out to the common electrode COM.

Therefore, since the compensating circuit 290 compensates the noise induced to the common electrode COM using the applied pulse voltage Vtsp for driving the touch screen panel, the display device having the touch screen panel capable of stabilizing the voltage applied to the common electrode may be implemented.

In a display device having a touch screen panel according to the embodiment of the invention, since the display panel driving board and the touch screen panel driving board are formed in one body, a display device having a touch screen panel along with reduced physical dimensions may be implemented.

In addition, since a connector for transmitting and receiving data between the display panel and the main system and between the touch screen panel and the main system is formed in the display panel driving unit, and the dummy pins are used as terminals for the touch screen panel driving unit, there is no need to assign additional pins and cables for the touch screen panel. Accordingly, the workability may be improved while material costs are saved at the same time.

In addition, since a separating region is formed at a boundary between the display panel driving unit and touch screen panel driving unit, it is possible to prevent noise from flowing from the display panel driving unit to the touch screen panel driving unit. Accordingly, it is possible to prevent interference due to the noise, improving sensitivity of the touch screen panel.

In addition, since the noise induced to the common electrode is compensated by using the compensating circuit, the voltage applied to the common electrode may be stabilized.

For the description of an embodiment of the invention, it has been described that a display device having a touch screen panel is implemented in a liquid display panel, the present invention is limited to thereto. For example, the present invention may also be applied to a display panel including a field emission display (FED), a plasma display panel (PDP), an electroluminescence device (EL), an elecrophoretic display panel, and the like.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:
1. A display device, comprising:
a display panel;
a touch screen panel on the front of the display panel;
an integration driving board on the rear of the display panel and defining a first area and a second area on a same plane, wherein the integration driving board further includes a display panel driving unit disposed in the first area, a touch screen panel driving unit disposed in the second area, a connector disposed in the first area, and a separator that divides the integration driving board into the first area and the second area to reduce electrical noise coupling from the display panel driving unit to the touch screen panel driving unit;
a main system; and
an integration cable directly connecting the connector to the main system,
wherein the display panel driving unit and the touch screen panel driving unit are connected to the main system through the same connector and the same integration cable,
wherein the connector includes a plurality of pins connected to the display panel driving unit and a plurality of dummy pins connected to the touch screen panel driving unit, and wherein the touch screen panel driving unit is connected to the plurality of dummy pins of the connector disposed in the first area through wires that extend from the second area to the first area of the integration driving board.

2. The display device according to claim 1, wherein the connector is used to transmit and receive signals between the display panel and the main system and between the touch screen panel and the main system through the integration cable connected to the connector and the main system.

3. The display device according to claim 1, wherein the connector is a low voltage differential signaling connector.

4. The display device according to claim 1, wherein the touch screens panel driving unit comprises:
   a first conductive pattern driving circuit, which supplies pulse voltage supplied from a power supply unit to a plurality of first conductive patterns arranged in a first direction with regard to the touch screen panel to scan the plurality of first conductive patterns; and
   a second conductive pattern driving circuit, which supplies the pulse voltage supplied from the power supply unit to a plurality of second conductive patterns arranged in a second direction cross over the first direction in such a way to be electrically insulated from the plurality of first conductive patterns; and scanning the plurality of second conductive patterns.

5. The display device according to claim 4, wherein the display panel driving unit comprises:
   a data driving unit, which supplies video data voltage to the data lines of the display panel;
   a gate driving unit, which supplies a gate pulse synchronized with the video data voltage to the gate lines of the display panel;
   a timing controller, which controls the operating timing of the data driving unit and the gate driving unit based on the timing signal supplied from the outside;
   a compensating circuit, which detects common voltage having induced voltage component induced at the common electrode of the display panel by the pulse voltage, supplies another pulse voltage of the same size but in opposite phase with an induction voltage component induced by the pulse voltage, removes the induction voltage component from the common voltage having the induction voltage component, and supplies another common voltage in which the induction voltage component is removed to the common electrode.

6. The display device according to claim 5, wherein the touch screen panel driving unit further comprises:
   a touch controller, which generates a plurality of scanning control signals for controlling the first and the second conductive pattern driving circuits to supply the scanning control signals to the first and second inductive pattern driving circuits; and
   a touch processor connected to the first and the second conductive patterns and which compares voltage of initial capacitance with voltage of current capacitance of each conductive pattern whenever the pulse voltage is supplied from the first and the second conductive pattern driving circuits to the first and the second conductive patterns, thereby providing the touch controller with a touch recognition signal, a touch non-recognition signal, and a touch position indicating whether to perform a touch operation.

7. The display device according to claim 1, wherein the display panel driving unit includes a timing controller and the touch screen panel driving unit includes a touch controller, wherein the timing controller of the display panel driving unit and the touch controller of the touch screen panel driving unit are provided on the integrated circuit board.

8. The display device according to claim 1, wherein the separator prevents noise from flowing from the display panel driving unit to the touch screen panel driving unit.

9. The display panel according to claim 1, further comprising a compensation circuit disposed between the display panel driving unit and the touch screen panel driving unit to compensate for noise induced by common electrode of the display panel.

10. A display device, comprising:
    a display panel;
    a touch screen panel on the front of the display panel;
    an integration driving board on the rear of the display panel;
    a separator that divides the integration driving board into a first area and a second area on a same plane to reduce the coupling of electrical noise between the first area and the second area;
    a display panel driving unit disposed in the first area of the integration driving board and including display panel driving circuits to drive the display panel;
    a touch screen panel driving unit disposed in the second area of the integration driving board and including touch screen panel driving circuits to drive the touch screen panel;
    a connector disposed in the first area of the integration driving board and connected to both the display panel driving unit and the touch screen panel driving unit;
    wherein the connector includes a first set of pins connected to at least one of the display panel driving circuits and a second set of pins connected to at least one of the touch screen panel driving circuits, the first set of pins being more than the second set of pins, and
    wherein the at least one of the touch screen panel driving circuits is connected to the second set of pins through wires that extend from the second area to the first area of the integration driving board.

11. The display device according to claim 10, wherein the connector includes a third set of pins connected to a back light power supply.

* * * * *